UNITED STATES PATENT OFFICE.

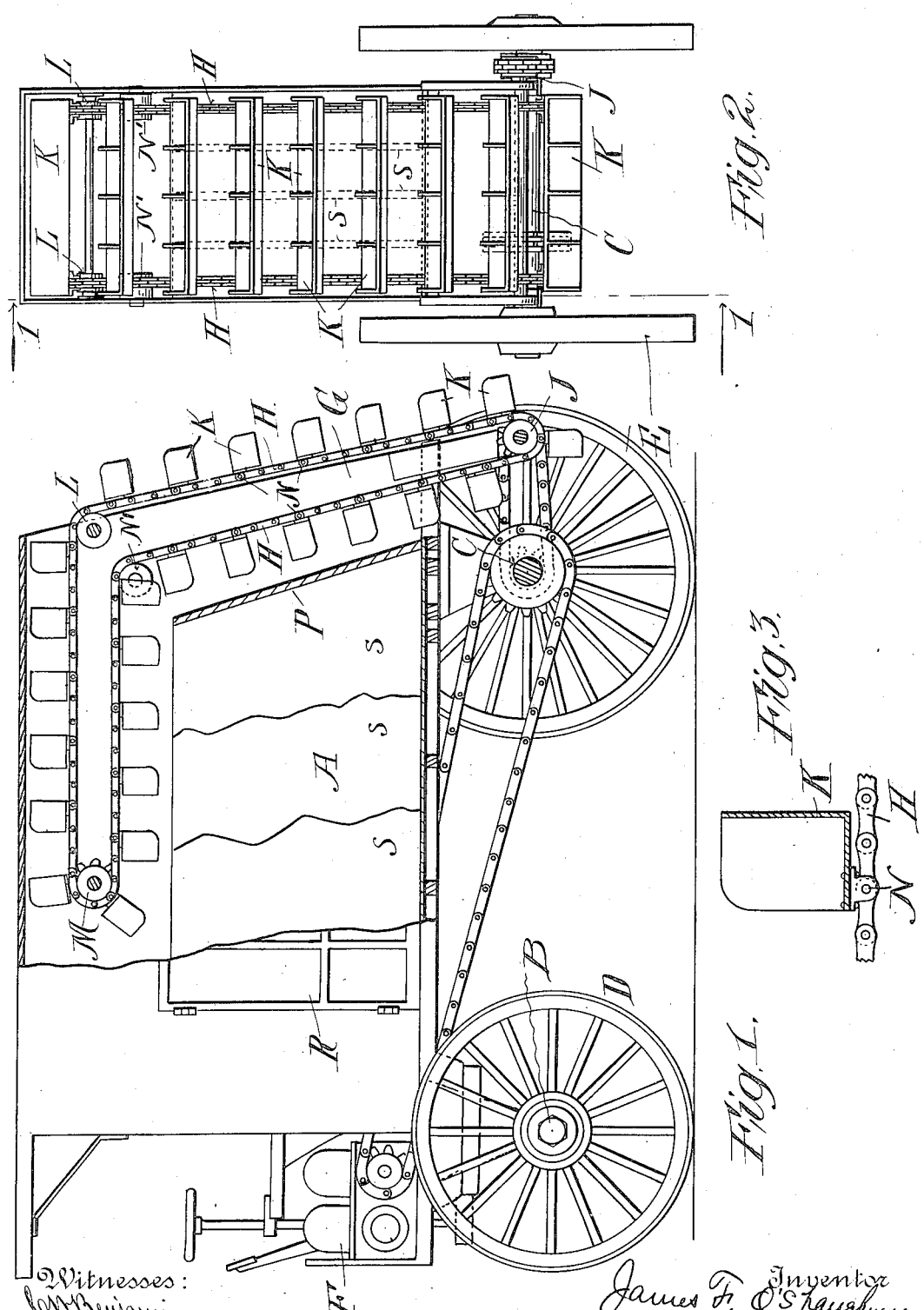

JAMES F. O'SHAUGHNESSY, OF NEW YORK, N. Y.

COTTON-GATHERING MACHINE.

No. 889,957.   Specification of Letters Patent.   Patented June 9, 1908.

Application filed July 8, 1907. Serial No. 382,610.

*To all whom it may concern:*

Be it known that I, JAMES F. O'SHAUGHNESSY, a citizen of the United States, residing in the city, county, and State of New York, have made a certain new and useful Invention in Cotton-Gathering Machines, of which the following is a specification.

This invention relates to machines for gathering cotton.

The object of the invention is to provide a machine which is simple in construction and efficient in operation for receiving the cotton as gathered by manual labor, and delivering the gathered cotton into a suitable receptacle to be transported, thereby relieving the individual laborer from the work and toil of supporting upon his back or shoulder the cotton as gathered by him.

A further object of the invention is to provide a machine of the nature referred to, whereby the manual picking operation of each individual laborer may be facilitated and the daily capacity increased.

Other objects of the invention will be more fully hereinafter set forth.

The invention consists substantially in the construction, combination, location and relative arrangement of parts, all as will be more fully hereinafter set forth, as shown in the accompanying drawing, and finally pointed out in the appended claims.

In the operation of harvesting the cotton crop as heretofore most successfully carried out, laborers equip themselves with bags which are suspended from the shoulders or otherwise, and such laborer proceeding along a row of cotton stalks, gathers or picks the opened cotton from the stalks by hand, and deposits the cotton so picked and gathered from the stalks into such bag. As the laborer proceeds with his work the accumulating cotton in the bag increases the weight which is suspended from his shoulders, thereby imposing increasing strain, labor and fatigue upon the laborer besides interfering with his free movements in the cotton picking operation. Moreover, in order to transfer the picked cotton from the hands of the laborer to the suspended bag, it is ordinarily necessary for the laborer to raise himself into an erect or upright position from a stooping or bending-over position. This repeated stooping and bending and raising imposes strain and physical tear, wear and fatigue upon the laborer, thereby materially decreasing the daily capacity in amount of cotton harvested by such laborer, besides imposing a physical strain, wear and fatigue which rapidly reduces the efficiency of the laborer in the harvesting of the cotton crop.

It is among the special purposes of my present invention to provide an apparatus which is simple in construction and efficient in operation, whereby the laborer in the cotton field is to a very large extent relieved of the physical wear, strain and fatigue imposed by the necessity for repeatedly bending or stooping over and raising up into an erect position imposed by the increasing load he is required to carry when the cotton bag is suspended from his shoulders.

In its essential characteristics my invention contemplates the provision of a vehicle supported upon wheels and adapted to be drawn, propelled or otherwise moved through a cotton field, and along the rows of cotton stalks, and supporting a body in the form of a receptacle in to which the gathered cotton is to be delivered.

My invention also contemplates the employment of traveling buckets or receptacles adapted to receive the cotton from the hands of the laborer as gathered or picked from the cotton stalks, and operating to deliver the same into the body receptacle.

The construction embodying these general principles may be varied, modified and changed throughout a wide range without departure from the spirit and scope of my invention. While, therefore, I have shown and will now describe a construction embodying the principles of my invention, and which is simple and efficient for the purpose, I do not desire to be limited or restricted to the exact details thereof.

Referring to the accompanying drawing, Figure 1, is a view in side elevation, partly in vertical longitudinal section, of a cotton gathering machine embodying the principles of my invention. Fig. 2, is a view in rear elevation of the same. Fig. 3, is a broken detailed view in section of a traveling carrier, showing a bucket or receptacle attached thereto.

In the accompanying drawing, reference sign A, designates the body or body receptacle of a vehicle, and of suitable size, depth, length and breadth to receive the supply of cotton to be delivered thereto, and to transport the same. The body A, may be supported upon the axles B, C, in any suitable, or convenient, or ordinary manner. In practice I prefer to elevate the axles B, C, and to employ wheels D, E, of large diameter, so as to elevate the body A, to a height of three or four feet, whereby such body may readily pass over the tops of the cotton stalks as the machine progresses through the field. The height of the body A, above the ground, however, is a matter dependent largely upon conditions encountered, and therefore my invention is not to be limited in this respect. The vehicle may be progressed through the cotton field and along the rows of cotton stalks in any suitable or convenient manner, as, for instance, by means of horse, mule or other power, but in practice I prefer to employ a motor F, adapted to be suitably mounted upon the frame of the vehicle, and suitably geared to an axle, preferably the rear axle. By employing a motor, the speed at which the vehicle may be progressed through the field or along the rows of cotton stalks may be varied or regulated as desired and as may be necessary in order to enable the cotton pickers or laborers to keep pace with such progression, while performing their duties of picking or gathering the cotton. The machine may be directed or guided in any suitable or convenient manner and from any suitable or convenient point, the particular mechanism for this purpose being unimportant and immaterial, and therefore not requiring any special illustration or description. The rear end G of the machine is preferably inclined upwardly and forwardly with respect to the length of the body A, thereof.

H, is a traveling carrier adapted to be driven from and operating over a roller J, suitably journaled at the lower end of the inclined portion G, and carrying gathering receptacles or buckets K. In this respect my invention is not to be limited or restricted. I employ for the carrier, sprocket chains operating over sprocket wheels J, L, and M, the sprocket wheels or rollers J, being located, as above explained, at the lower end of the inclined portion G, while the sprocket L, is located adjacent the upper end of such inclined portion. The sprocket M, is located at a convenient point transversely of the body A, at a point intermediate the ends of such body A.

The buckets or gathering receptacles K, may be secured to the carrier H, in any suitable or convenient manner. I have shown said buckets or carriers fastened to lugs or bars N, carried by the sprocket chains H, and extending transversely from the sprocket chain at one side or edge of the body to that at the other side or edge thereof. The carrier H, may be actuated in any suitable or convenient manner so as to travel around and be driven by the sprockets or rollers J, thence up the inclined surface of the end G, of the vehicle body, over the sprockets L, at the upper end of such inclined part, thence forwardly of the body of the vehicle over and around sprocket M, thence rearwardly over a guide N', thence back to and around the rollers or sprockets J. The sprockets J, may be driven in any suitable or convenient manner as, for instance, from the motor F, the axle C, or otherwise, as may be desired. The speed of travel of the carrier may be regulated and varied to suit the speed of operation of the laborers or pickers in extracting or gathering the cotton from the cotton stalks. Such laborers or pickers deposit the manually gathered or picked cotton, and as picked or gathered from the stalks, into the pockets or buckets K, the latter elevating the cotton thus deposited therein up the inclined rear end of the body of the machine, and delivering the same into the body receptacle of the vehicle, such cotton falling out of the buckets and into the body receptacle at the point where the carrier travels around the sprocket or roller M.

If desired, and in order to prevent the accumulation of cotton within the body receptacle, after being deposited by the buckets into the body receptacle, from being swept backwardly, or towards the rear end of the body receptacle by the buckets, and hence carried out of the machine with the buckets, I propose to place an obstructing plate or partition P, transversely across the rear end of the body receptacle, the bucket carrier operating over the top edge thereof as clearly shown. If desired, the cotton deposited into the body receptacle may be distributed throughout the length of the receptacle by hand or otherwise as may be convenient. If desired, and in order to enable the contents of the receptacle to be removed therefrom readily, I may provide a door R, in one or both sides thereof or elsewhere as the bottom.

It may sometimes be desirable to separately measure the product of the day's labor of each laborer, that is, the amount of cotton picked or gathered by each laborer during a day's work, may be separated and maintained separated from that of other laborers using the same machine, in order to ascertain the daily capacity of each laborer and to enable compensation for services to be based on the work accomplished by each individual. This is particularly desirable since it is customary to pay cotton picking labor by the amount, by weight of cotton gathered by the individual laborer. In order to accomplish this result I propose to provide the carrier H, with a series of rows of buckets K, each row extending lengthwise of the carrier, and enabling each individual laborer to utilize or to deposit the cotton gathered or picked by him into his own line or row of buckets, and I divide the body receptacle A, into corresponding compartments into each of which a separate line or row of buckets deliver. The body receptacle may thus be divided into separate compartments by division or partition plates S, arranged therein and extending longitudinally of such body part. In this way the product of the day's labor of each individual may be kept separate from that of each of the other laborers employing the same machine.

By arranging the carrier buckets to travel up the inclined surface of the rear end of the vehicle, and by extending the carrier the entire transverse width of such rear it will be readily seen that as the machine progresses through the field and along the rows of cotton stalks the laborers follow up at the rear and when they pick or gather the cotton from the open bolls they deposit the picked or gathered cotton into the traveling buckets and the latter deliver such cotton into the body receptacle. It will also be seen that at the point where the manual picking operation is carried on there is nothing to obstruct the free operation of the laborer, and the entire space between adjacent rows of the cotton stalks may be occupied by the laborer, thereby greatly facilitating his movements and without obstruction.

It is obvious that the lower roller J, over which the carrier operates may be located as near the ground as may be desired so that the cotton growing close to the ground may be picked and deposited in the buckets without the necessity for the laborer repeatedly raising up to an erect position. It is also obvious that the speed of progression of the machine through the field may be regulated by the speed at which the laborers are able to perform their work.

From the foregoing description it will be seen that I provide an exceedingly simple and efficient cotton gathering machine wherein the cotton picking operation is carried on manually but the laborer is relieved of much of the toilsome fatigue wear and tear incident to the labor of harvesting the cotton crop and hence is enabled to greatly increase the daily capacity of his work, and hence to increase his daily earnings.

Many variations and changes in the details of construction and arrangement of parts might readily occur to persons skilled in the art and still fall within the spirit and scope of my invention. I do not desire, therefore, to be limited or restricted to the exact details shown and described. But Having now set forth the object and nature of my invention and a construction embodying the principles thereof, what I claim as new and useful and of my own invention and desire to secure by Letters Patent is 1. In a machine for gathering cotton, a vehicle having a body receptacle, and a vertically inclined rear end, a carrier operating over such inclined rear end and adapted to receive the cotton as picked from the cotton stalks and to deliver the same into the body receptacle, means for operating said carrier, and means for progressing the vehicle.

2. In a machine for gathering cotton, a vehicle having a body receptacle, a carrier operating vertically up the rear end thereof and adapted to receive the picked cotton and to deliver the same into said receptacle, a transverse partition plate arranged in said receptacle to prevent the delivered cotton from being swept out by said carrier, means for operating said carrier and means for progressing said vehicle.

3. In a machine for gathering cotton, a vehicle having a body receptacle divided longitudinally into compartments, a carrier having means to deliver to each compartment, means for operating said carrier and means for progressing said vehicle.

4. In a machine for gathering cotton, a vehicle having a body receptacle divided longitudinally into compartments, a carrier having longitudinal rows of buckets, each row adapted to receive gathered cotton from the hands of an operator and to deliver the same into a compartment, means for actuating said carrier and means for progressing the vehicle.

5. In a machine for gathering cotton, a vehicle having a body receptacle provided with a downwardly inclined rear end, a roller arranged at the lower edge of said rear end, a roller arranged at the upper edge of said rear end, a carrier extending the transverse width of said rear end and operating over said rollers, means for actuating said carrier, and means for progressing said vehicle.

6. In a machine for gathering cotton, a vehicle having a body receptacle, a roller carried by and arranged at the lower edge of the rear end of the receptacle, a roller carried by and arranged at the upper edge of said rear end, a roller carried by and arranged at a point intermediate the ends of said receptacle, all of said rollers extending transversely of the body receptacle, a carrier operating over said rollers, means for actuating said carrier, and means for progressing said vehicle.

7. In a machine for gathering cotton a vehicle having a body receptacle, rollers extending transversely of said receptacle, a carrier operating over said rollers, and running up the rear end of said vehicle, a transversely extending partition plate arranged in said receptacle adjacent the rear end thereof, a guide roller for deflecting said carrier over the top edge of said plate, means for actuating said carrier and means for progressing said vehicle.

8. In a machine for gathering cotton, a vehicle having a body receptacle, division plates arranged therein and extending longitudinally thereof to divide the same into compartments, transversely arranged rollers, a carrier operating over said roller and running up the rear end of said receptacle buckets carried by said carrier and arranged in lines extending longitudinally of the machine, each line of receptacles delivering into a compartment, means for operating said carrier, and means for progressing said vehicle.

In testimony whereof I have hereunto set my hand in the presence of the subscribing witnesses, on this 28th day of June, A. D.. 1907.

JAMES F. O'SHAUGHNESSY.

Witnesses:
S. E. DARBY,
JOSEPH KLEM.